(12) United States Patent
Parrish

(10) Patent No.: US 7,770,813 B2
(45) Date of Patent: Aug. 10, 2010

(54) SPRAY PENETRATION CONTROL METHOD

(75) Inventor: Scott E. Parrish, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 195 days.

(21) Appl. No.: 11/548,299

(22) Filed: Oct. 11, 2006

(65) Prior Publication Data
US 2008/0099573 A1    May 1, 2008

(51) Int. Cl.
*F02D 1/06*     (2006.01)
*A01G 27/00*     (2006.01)

(52) U.S. Cl. .................. 239/5; 239/67; 239/70

(58) Field of Classification Search .............. 239/5, 239/70, 88, 89, 102.2, 533.2, 533.3, 585.1, 239/67; 123/406.18, 406.23
See application file for complete search history.

(56) References Cited

U.S. PATENT DOCUMENTS

| 4,499,871 | A  | * | 2/1985 | Neitz et al. .................. 123/276 |
| 4,763,478 | A  | * | 8/1988 | Liemert et al. ................. 60/633 |
| 5,924,404 | A  | * | 7/1999 | Ruman et al. .......... 123/406.18 |
| 6,557,776 | B2 | * | 5/2003 | Carroll et al. .................. 239/5 |
| 6,681,740 | B1 | * | 1/2004 | Majewski et al. ............ 123/320 |
| 7,059,301 | B2 | * | 6/2006 | Stockner et al. .............. 123/446 |

* cited by examiner

*Primary Examiner*—Davis Hwu

(57) ABSTRACT

A spray penetration control method that controls penetration of fluid injected as a spray from an injector. The control method uses multiple successive injection events instead of single injection events to reduce overall spray penetration. Dwell times may be fixed or varied between successive injection events to reduce overall spray penetration. Also, the mass of fluid spray injected by the injector may be fixed or varied during each multiple successive injection event to reduce overall spray penetration and the number of successive injection events may be adjusted so that a desired total amount of mass is delivered in accordance with a desired penetration.

14 Claims, 2 Drawing Sheets

SPRAY PENETRATION CONTROL METHOD

TECHNICAL FIELD

The present invention generally relates to control of spray penetration for use in the field of fluid injectors.

BACKGROUND OF THE INVENTION

Many in the field of engine development have investigated the use of multiple injections to fuel engines. Often fuel is introduced at different points in time throughout the engine cycle.

In direct-injection engine calibration, a given operating speed and load requires a certain amount of fuel to be injected. Most often the fuel is injected as a spray in a single injection event. The penetration of the spray into the engine's combustion chamber is known to be an important parameter. If the spray penetrates too far into the chamber and wets the chamber surfaces, high hydrocarbon (HC) emissions and lower fuel economy may result.

Therefore, what is needed is a device and method that provides for spray penetration control.

SUMMARY OF THE INVENTION

Generally, the present invention provides a spray penetration control method that controls penetration of fluid injected as a spray from an injector. The control method uses multiple successive injection events to reduce overall spray penetration.

Dwell times may be fixed or varied between successive injection events to reduce overall spray penetration.

Additionally, the mass of fluid injected by the injector may be fixed or varied during each multiple successive injection event to reduce overall spray penetration. Additionally, the number of successive injections may also be fixed or varied to further control a total mass delivered and to reduce overall spray penetration.

BRIEF DESCRIPTION OF THE DRAWINGS

These and other objects, features and advantages of the present invention will become apparent from the following detailed description and the appended drawings in which.

DESCRIPTION OF THE PREFERRED EMBODIMENT

Figure 1:
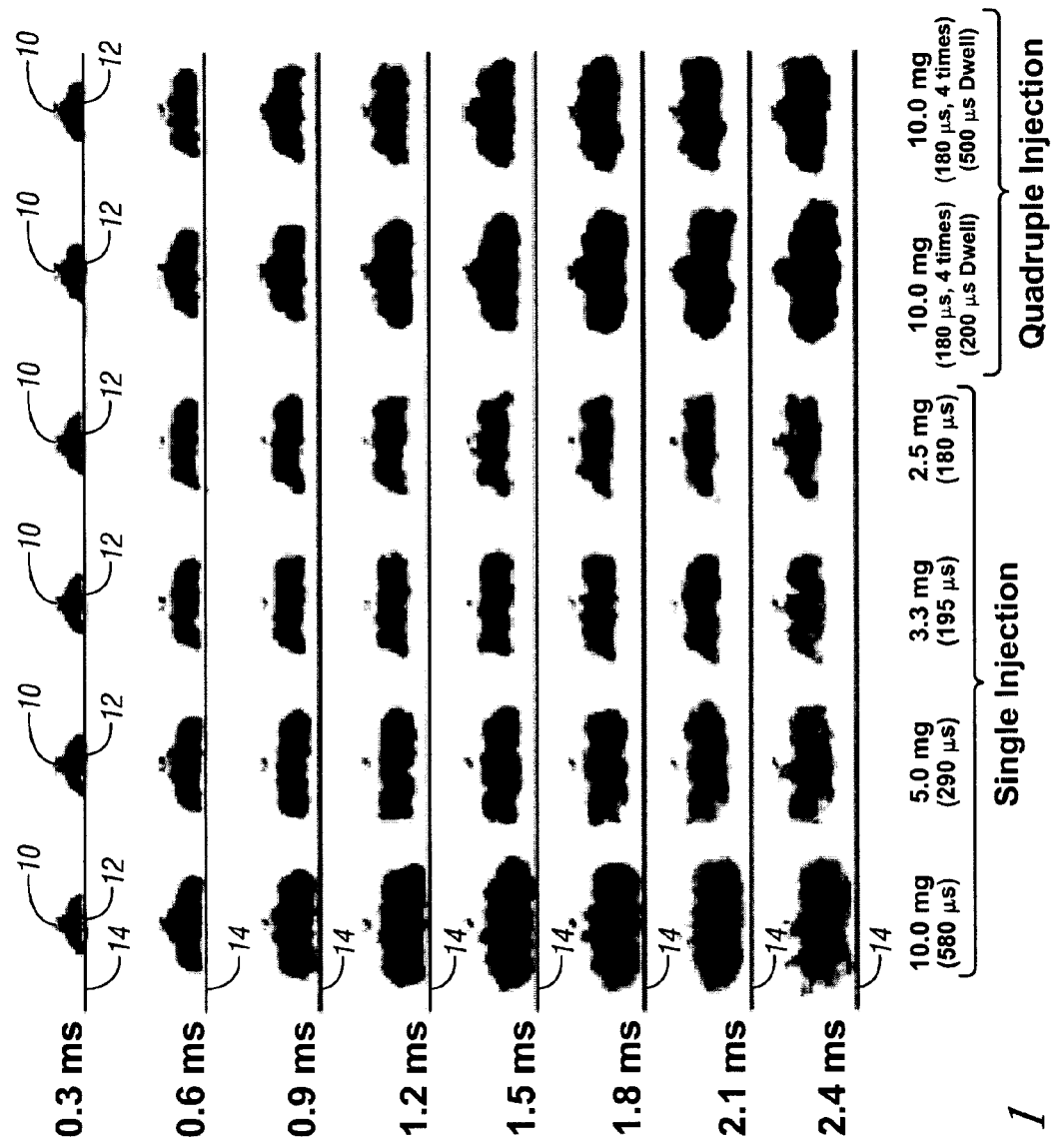
FIG. 1 illustrates a graphical representation of penetration progress of a spray in space as a function of time in accordance with one embodiment of the invention.

The present invention generally includes a method of controlling spray penetration of fluid injected as a spray from an injector. More particularly, the present invention uses multiple injection events to reduce spray penetration of the injected fluid.

In an engine, such as an internal combustion engine having an associated combustion chamber, fuel mass scheduled for delivery is injected as an injection event in the combustion chamber. There are optimal timings, number of injection events, and fuel masses injected for each injection event, and optimal dwell times between injection events to control spray penetration within the combustion chamber.

An example comparing single and multiple injection events is given below, comparing effects of single injection and the multiple injections of the present invention, as described.

The present invention provides a method for injecting a fluid spray associated with a minimal spray penetration. In the context of direct-injection engines, reduced penetration may prevent unwanted combustion chamber surfaces from being wetted and thus, impact fuel economy and emissions. In addition, if spray penetration can be reduced, higher injection pressures may be utilized thereby potentially improving the fuel preparation process and also improving fuel economy and emissions.

In one embodiment of the invention, the method and system for reduced spray penetration may be executed within a fuel injected engine having an associated fuel injector capable of multiple injection events into an internal combustion chamber of the engine.

Any type of injector actuator that has come or may come into existence capable of cycling fast enough to produce multiple spray events within a short amount of time may be used. Injectors with direct acting actuators such as, in a non-limiting example, piezoelectric actuators allow much faster cycling times than conventional solenoid injector actuators thereby enabling multiple events preferably, more than three injections within a short amount of time, wherein a short amount of time may be equal to or less than 3 ms.

Also, it is contemplated that the method of using multiple injection events to control spray penetration may apply to any type of fast cycling fluid spray injectors that operate to spray fluid in a variety of applications not limited only to engine combustion chambers. Additionally, the method of using multiple successive injections may be used in numerous applications, such as, but not limited to spray painting and dispensing of liquid medications.

Dwell times between successive injection events may be either fixed or varied to reduce overall spray penetration. Dwell is a measure of the amount of time an injector remains closed between successive injection events, and is typically measured in terms of microseconds, or, alternatively, in terms of degrees of crankshaft rotation. The dwell time influences the overall spray penetration. A long dwell time between successive injection events, such as for example, dwell times greater than 200 µs promotes each injection event to be independent of the other injection events and the spray penetration is nearly that of a single, short duration event. Short dwell times between injection events, such as for example, 200 µs or less may promote interactions between individual injection events but may still produce reduced overall penetration as compared to a single, long duration event.

Spray penetration is also dependant on injected mass. The mass of fluid spray injected by the injector may be fixed or varied to reduce overall spray penetration. Additionally, the total number of successive injections may be adjusted in accordance with the mass of fluid spray injected during each injection event so that a desired total amount of mass is delivered in accordance with a desired penetration.

Figure 2:
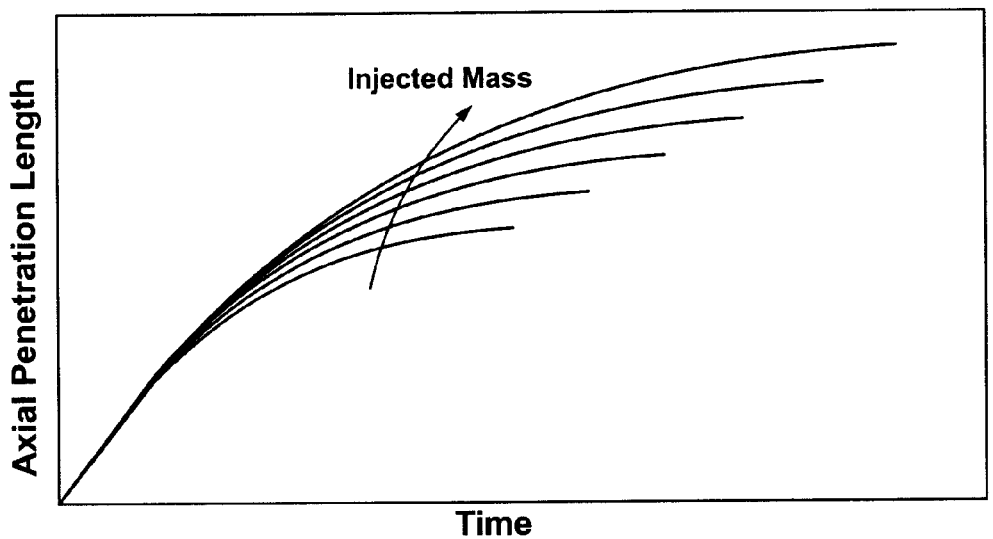
FIG. 2 illustrates a graph of axial penetration length of an injected mass as a function of time for a single injection event in accordance with one embodiment of the invention.

As shown in FIGS. 1 and 2, in the case of single injection, spray penetration increases with injected mass. As opposed to injecting the fuel into the chamber with a single injection event, multiple and successive injection events may be used to reduce the overall fluid spray penetration.

Figure 3:
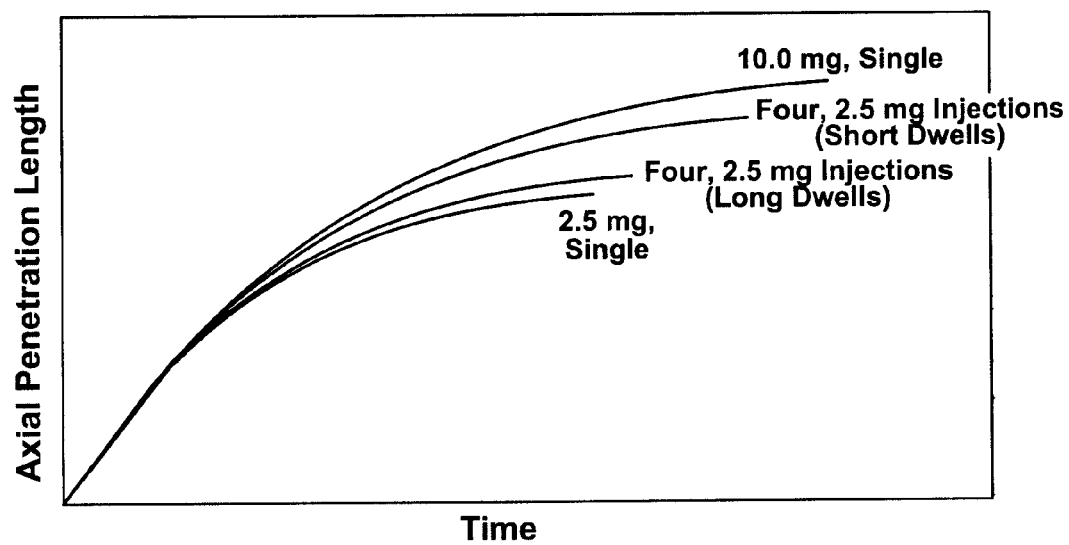
FIG. 3 illustrates a graph of axial penetration length of an injected mass as a function of time for both single and multiple injection events.

Spray penetration as a function of time is shown in FIGS. 1-3. More particularly, FIGS. 1 and 3 illustrate examples of reduced spray penetration using multiple, successive injection events. As shown in FIGS. 1 and 3, when a given amount of mass is injected through use of multiple successive injection events, as opposed to a single injection event, the overall spray penetration is lower due to the fact that each of the individual events are, in themselves, less penetrating.

The concept of reducing spray penetration through the use of multiple injections has been tested and verified with bench type spray measurements as shown in more detail in FIG. 1. FIG. 1 illustrates a graphical representation of penetration progress of a spray in space as a function of time in accordance with one embodiment of the invention.

FIG. 1 illustrates penetration for single injection events and quadruple injection events. More particularly, FIG. 1 illustrates penetration progress of a spray 12 in space as a function of time.

Each horizontal line represents a target surface 14. In one embodiment, the target surface 14 may represent an inner surface of a combustion chamber in a direct-injection engine. However, the target surface may be any surface spaced apart from a nozzle 10 of the fluid injector towards which the nozzle sprays injected fluid. The injector tip or nozzle 10 is shown injecting a predefined mass of fluid, wherein the fluid is fuel measured in milligrams, injected as a spray 12 for each single or quadruple injection events. The initial time elapsed from the first injection event is shown at 0.3 milliseconds wherein the fluid sprayed is closest to the nozzle 10 when the spray is first ejected from the nozzle 10.

In an embodiment of the invention associated with a single injection event, after 2.4 ms from the initial injection, the single injection of the mass 10 mg has reached the target surface 14 and thus has a large axial spray penetration.

In one embodiment of the invention associated with the quadruple injection event, a smaller injected mass of 2.5 mg, which totals 10 mg after four injections, is injected in four injection events each 180 μs in duration. The smaller mass injected provides for softer spray penetration and does not reach the target surface. As shown 10 mg may be injected in multiple successive injection events.

In one embodiment, the mass injected in each injection event is fixed, the mass injected in each injection event equals a total mass injected divided by a total number of multiple, successive injections. For example, when 10 mg is injected in a total of four injection events, a mass of 10 mg/4, or 2.5 mg is injected in each of the four injection events. As shown in FIG. 1, each injection of 2.5 mg are each injected during multiple, successive injection events each having a duration of 180 μs. The dwell time may be fixed or varied as shown to reduce overall spray penetration.

In one embodiment of the invention shown in FIGS. 1 and 3, the dwell time between each of the quadruple injection events is 200 μs, and in another embodiment, the dwell time between each of the quadruple injection events is 500 μs.

Thus the times shown along a vertical edge of FIG. 1 represent a total time elapsed after an initial injection of fluid towards the target surface 14. The total mass of fluid injected associated with each injection are each shown along a bottom horizontal edge of FIG. 1. The total mass injected through use of a single injection event are shown in FIG. 1 as follows: 10 mg injected for a total injection event duration of 580 μs, 5 mg injected for a total injection event duration of 290 μs, 3.3 mg injected for a total injection event duration of 195 μs, and 2.5 mg injected for a total injection event duration of 180 μs.

The total mass injected through use of a quadruple injection event are shown in FIG. 1 as follows 10 mg injected as 2.5 mg fixed mass events injected for fixed event durations of 180 μs during each of four total injection events having associated 200 μs and 500 μs dwell times, respectively. For the quadruple examples shown in FIG. 1, the injection duration for each injection was 180 μs so the total time for all four injections equals: 180 μs×4 plus the dwell×3. In the case of 200 μs dwell this equates to 720+600=1320 μs.

Additionally, both the amount of mass injected in each injection event and the number of multiple successive injections may be varied. The total duration of the multiple successive injections plus the dwell time in between each of the multiple successive injections that equals or is less than 3 ms are considered short overall duration injection events.

As shown, more injections with dwell times between injections reduce spray penetration of the injected fluid mass. Additionally, the longer the dwell time, the less the axial penetration length from the spray nozzle.

FIG. 2 illustrates a graphical representation of axial penetration as a function of time and injected mass for a single fuel injection event. As shown, each of the curves represent injected mass over time, wherein the curves closer to the X-axis represent lower mass injections.

FIG. 3 illustrates axial penetration as a function of time for single injection and quadruple injection events. In the quadruple injection event, overall spray penetration is inversely proportional to the dwell time between individual events. The Y-axis represents axial penetration length from a nozzle tip to a leading edge of the spray. The X-axis represents a total time elapsed from an initial injection event.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

The invention claimed is:

1. Method for controlling spray penetration of fluid injected with a controllable injector, comprising:
   providing a total injection event comprising a number of more than three multiple successive fluid injection events, each successive fluid injection event providing a spray of fluid, wherein the spray of fluid from all fluid injection events form an overall spray to deliver a predefined mass of fluid during the total injection event;
   reducing overall spray penetration of the overall spray of the total injection event by providing a dwell time between the successive fluid injection events that allows each successive fluid injection event to be independent of other successive fluid events so that the overall spray penetration of the total injection event is reduced relative to that of a single fluid injection event delivering the predefined mass of fluid; and
   wherein the multiple successive fluid injection events, including the dwell time between successive fluid injection events, occurs within a time equal to or less than 3 milliseconds.

2. The method for controlling spray penetration of claim 1, wherein the dwell time is greater than about 200 μs.

3. The method for controlling spray penetration method of claim 1, further comprising:
   varying mass of the fluid injected by the injector during each of the multiple successive fluid injection events to reduce overall spray penetration.

4. The spray penetration control method of claim 3, further comprising:
varying the number of the multiple successive fluid injection events to reduce overall spray penetration.

5. The method for controlling spray penetration of claim 1, wherein the mass of fluid injected in each multiple successive fluid injection event is fixed and equals a total mass of fluid injected divided by a total number of the multiple, successive fluid injection events.

6. The method for controlling spray penetration of claim 1, wherein the fluid injected is fuel injected into a combustion chamber associated with a fuel injection engine.

7. The method for controlling spray penetration of claim 1, wherein the injector comprises a piezoelectric actuator.

8. Spray penetration control method for an internal combustion engine comprising:
controlling spray penetration of fuel injected as a spray into a combustion chamber of the engine through use of a total injection event comprising a number of more than three multiple successive injection events that includes a dwell time between each successive injection event, and wherein each successive injection event provides a spray of fuel where the spray of fuel from all of the injection events form an overall spray to deliver a predefined mass of fuel during the total injection event, the total injection event occurring within a time equal to or less than 3 milliseconds to reduce overall spray penetration of the overall spray of the total injection event relative to that of a single injection event delivering the predefined mass of fuel.

9. Spray penetration control method comprising:
injecting fluid as an overall spray into an injection chamber through use of a total injection event comprising a number of multiple successive injection events, the total injection event including a respective dwell time between each successive injection event, each successive injection event providing a spray of fluid, the spray of fluid from all successive injection events forming the overall spray to deliver a predefined mass of fluid, wherein all of said multiple successive injection events, including the respective dwell times, occur within a total injection event of 3 milliseconds or less; and
varying mass of the fluid injected by the injector into the injection chamber during each of the multiple successive injection events so that overall spray penetration of the overall spray into the injection chamber is reduced relative to that of a single injection event delivering the predefined mass of fluid.

10. The spray penetration control method of claim 9, wherein the mass of the fluid injected in each multiple successive injection event is fixed and equals the predefined mass of fluid injected during the total injection event divided by a total number of the multiple successive injection events.

11. The spray penetration control method of claim 9 further comprising:
adjusting the number of multiple successive injection events and the mass of the fluid injected during each of the multiple successive injection events so that the predefined mass of fluid is delivered during the total injection event in accordance with a desired penetration.

12. The spray penetration control method of claim 9, wherein the number of multiple successive injection events is greater than three.

13. The spray penetration control method of claim 9, wherein dwell time between each of the multiple successive injection events is adjusted to reduce spray penetration.

14. The spray penetration control method of claim 9, wherein the dwell time between each of the multiple successive injection events is adjusted to be greater than about 200 µs.

* * * * *